Inventor
HANS ERNST
LESTER F. NENNINGER
By
H. K. Parsons
Attorney

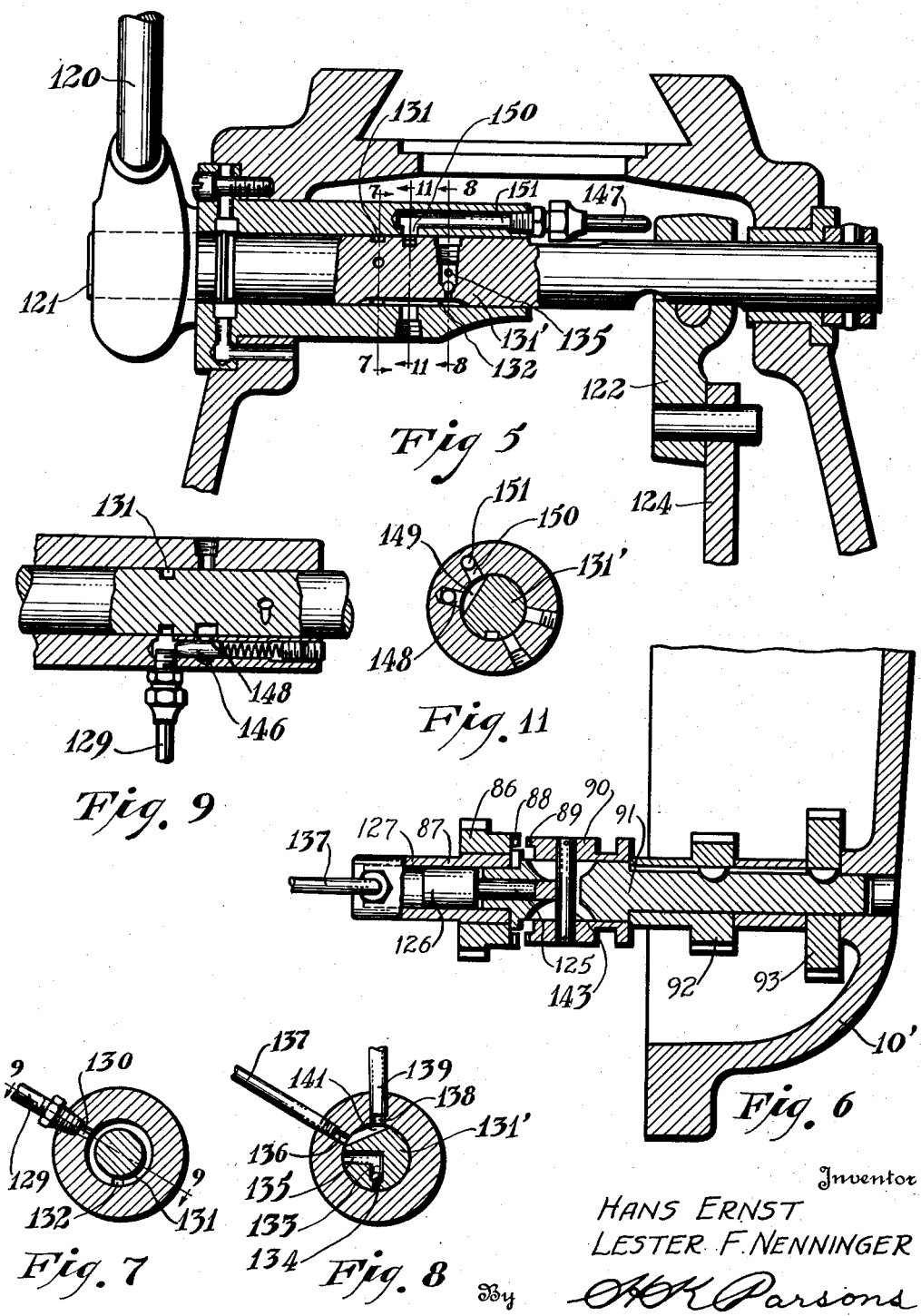

Patented Apr. 18, 1933

1,904,971

UNITED STATES PATENT OFFICE

HANS ERNST AND LESTER F. NENNINGER, OF CINCINNATI, OHIO, ASSIGNORS TO THE CINCINNATI MILLING MACHINE COMPANY, OF CINCINNATI, OHIO, A CORPORATION OF OHIO

MILLING MACHINE

Application filed May 31, 1930. Serial No. 458,852.

This invention relates to machine tools and more particularly to an improved mechanism for controlling the actuation thereof.

One of the objects of the present invention is the provision of an improved control mechanism for a variable speed transmission of a machine tool such as a milling machine.

Another object of this invention is the provision of a power actuated control mechanism adapted to effect progressive speed changes in a variable speed transmission of a milling machine.

A further object of this invention is the provision of a variable speed transmission having hydraulically actuated shifters and a power actuated selector valve for controlling the same to effect progressive changes in speed of the transmission.

An additional object of this invention is the provision in a milling machine having a variable speed spindle transmission with rate change mechanism therefor, of interlocking means to prevent rate changes being made during rotation of the spindle.

Other objects and advantages of the present invention should be readily apparent by reference to the following specification considered in conjunction with the accompanying drawings illustrative of one embodiment thereof but it will be understood that any modifications may be made in the specific structural details herein disclosed within the scope of the appended claims without departing from or exceeding the spirit of the invention.

Referring to the drawings in which like reference numerals indicate like parts:

Figure 4 is a sectional view of the selector valve.

Figure 5 is a detail partially in section of the starting clutch control shaft.

Figure 6 is a detail view of the hydraulic knock-out for the control clutch of the selector valve rotating mechanism.

Figure 7 is a section on the line 7—7 of Figure 5.

Figure 8 is a longitudinal section on the line 8—8 of Figure 5.

Figure 9 is a section on the line 9—9 of Figure 7.

Figure 11 is a section on the line 11—11 of Figure 5.

Figure 1:
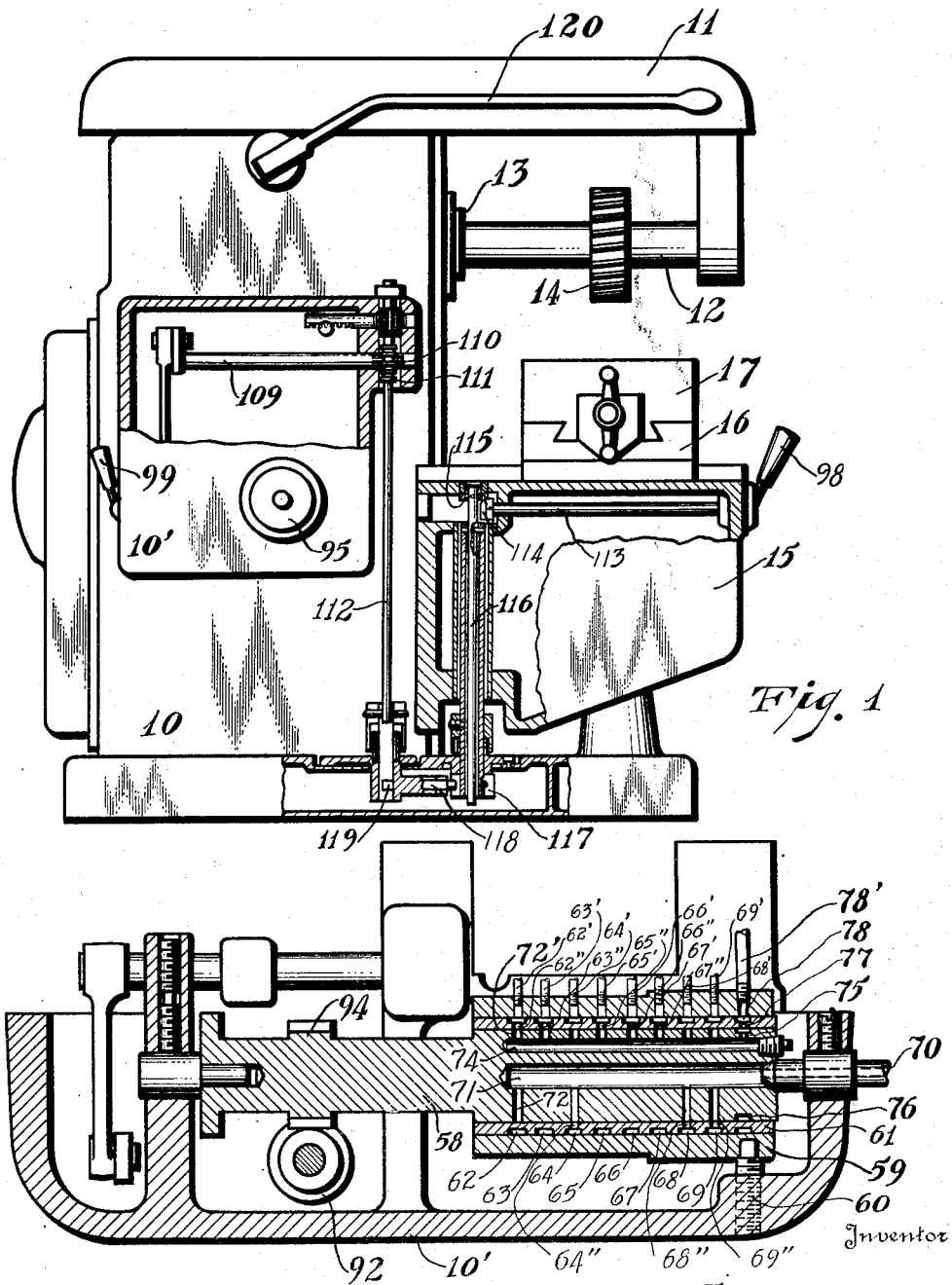
Figure 1 is an elevation of a milling machine embodying the principles of this invention.

In the drawings the reference numeral 10 indicates the column of a milling machine having mounted on the top thereof the overarm 11 for supporting the outboard end of the cutter arbor 12 which is fixed at its other end in the cutter spindle 13 for actuating the cutter 14. A work support is also mounted on the column for presenting work to the cutter and preferably consists of the knee 15 slidable on the column, the saddle 16 translatably mounted on the knee for movement toward and from the column and the work table 17 reciprocably mounted on the saddle.

Figure 2:
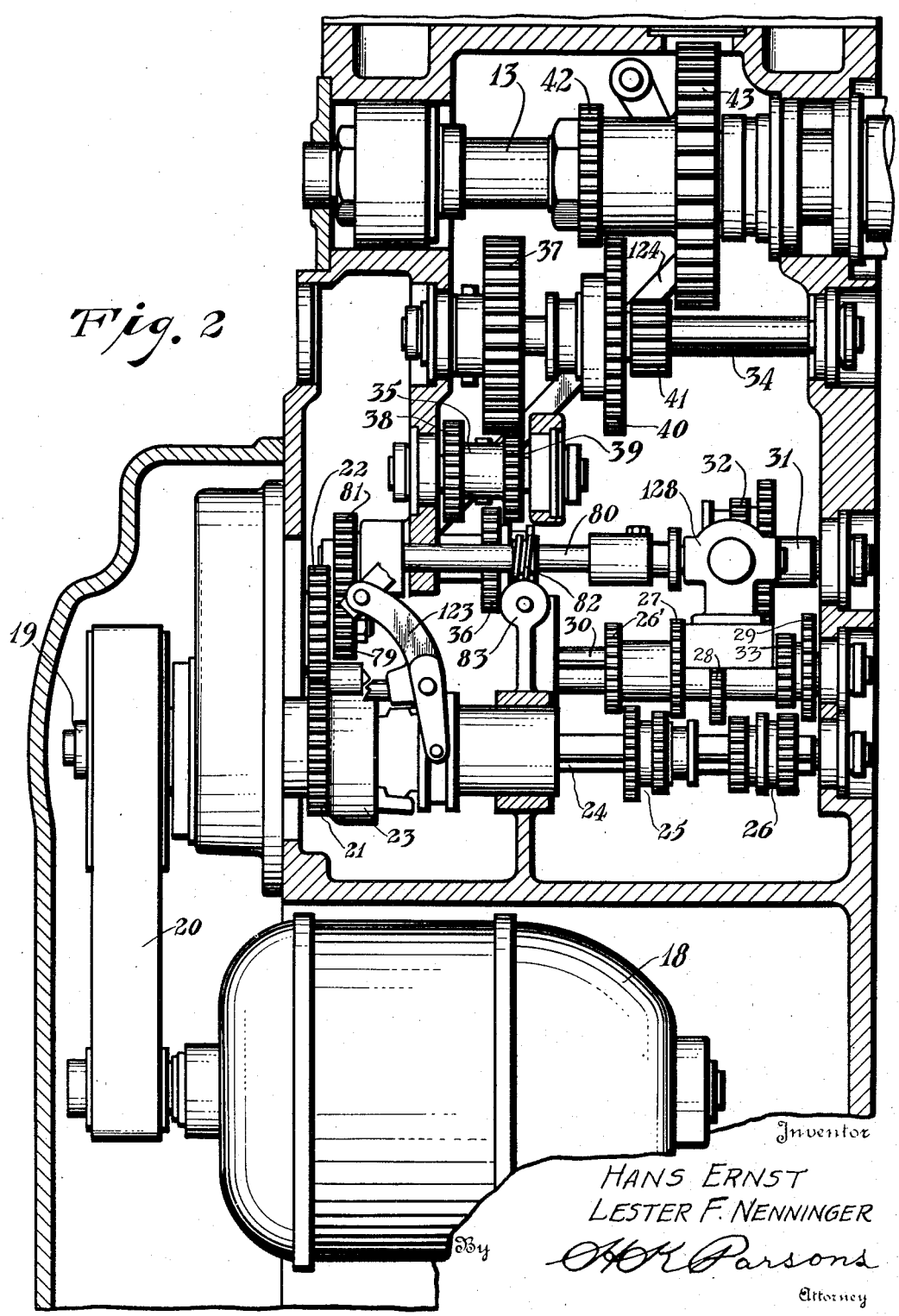
Figure 2 is an expanded view of the spindle transmission.

The cutter spindle 13 is adapted to be driven at a plurality of rates of speed and to this end a variable speed transmission is provided which is interposed between the spindle and the prime mover 18 mounted in the base of the column, as shown more particularly in Figure 2. A main shaft 19, is journaled in the column for actuation by the prime mover through a chain or belt 20 and has mounted thereon for continuous rotation therewith the gear 21 for driving through the gear 22 the speed change mechanism and has also attached thereto the clutch 23 for coupling therewith the spline shaft 24 of the variable speed transmission to the spindle.

Mounted on the shaft 24 are the shiftable gear couplets 25 and 26. The first couplet is adapted to engage the gear 26' or 27 and the second couplet is adapted to engage the gear 28 or 29 mounted upon the shaft 30 which is journaled in the column parallel to the shaft 24 to drive the same at four different rates of speed. A shaft 31 adjacent to shaft 30 has the shiftable gear couplet 32 slidably mounted thereon for engagement with either the gear 28 or the gear 33 fixed to the shaft 30 for effecting eight different rates of rotation in the shaft 31. A shaft 34 is adapted to be driven from the shaft 31 in either a forward or a reverse direction through the reverser 35 interposed between the gear 36 slidably mounted on the shaft 31 and the gear 37 fixed to the shaft 34. The arrangement being such that the gear 36 meshes direct with the gear 37 for rotation in one direction and meshes with the gear 38 to drive the shaft in a reverse direction through the gear 39 which is in constant mesh with the gear 37. A pair of backgears 40 and 41 are slidably mounted on the shaft 34 for respectively engaging the gears 42 and 43 fixed to the spindle 13. This arrangement provides for actuation of the cutter spindle by the prime mover at sixteen different rates of speed.

Figure 10:
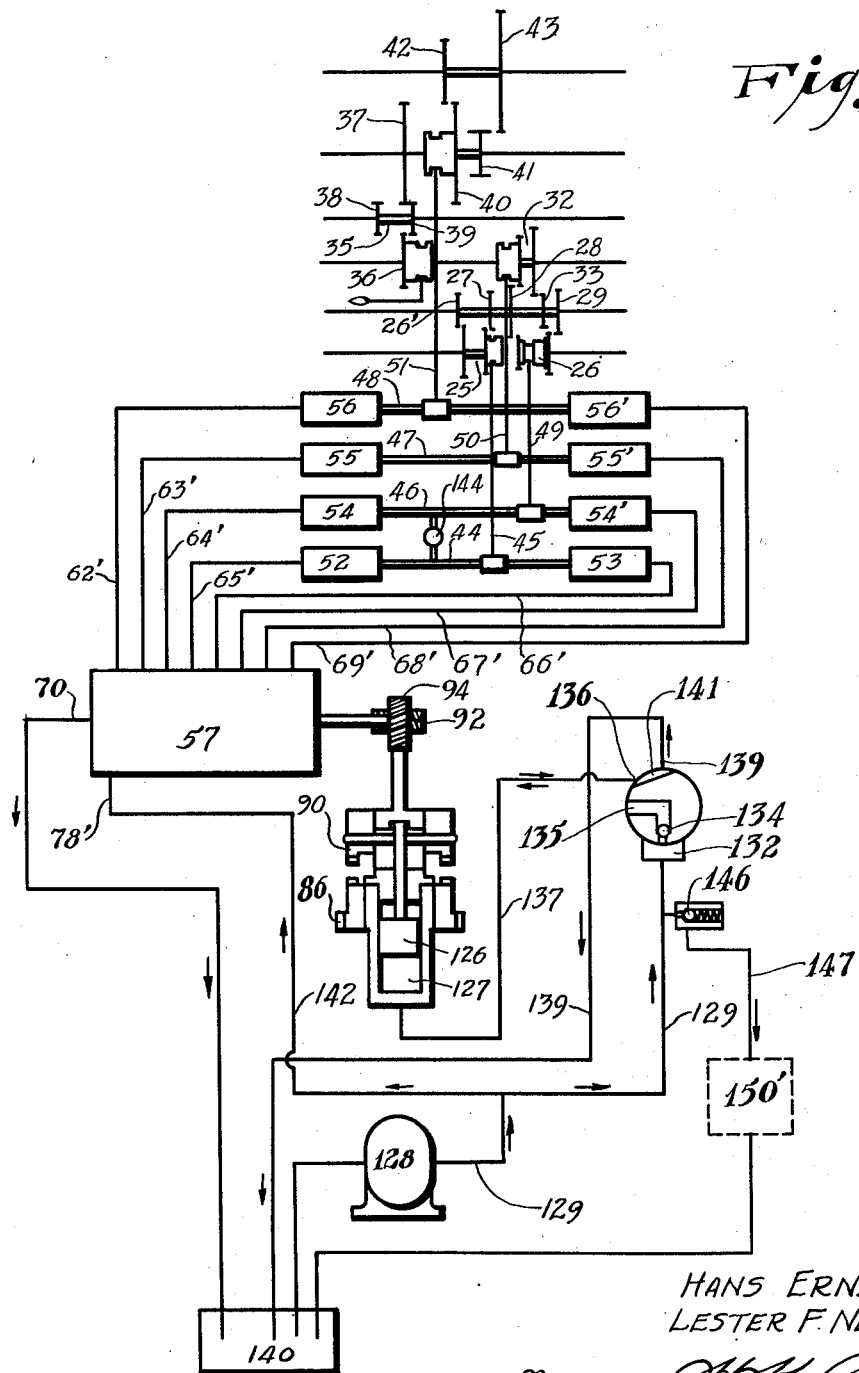
Figure 10 is a diagrammatic view of the hydraulic circuit for the speed change mechanism.

In order to effect the various rates of speed in the spindle transmission, power means such as a plurality of hydraulic motors preferably in the form of a piston and cylinder have been provided for shifting the various movable members of the transmission. In other words, each shiftable element is connected to an individual piston rod having double ended pistons mounted in separate cylinders and means are provided for controlling the admission of fluid pressure to either cylinder whereby the direction of movement of each shiftable element may be controlled. For instance, a piston rod 44, as shown in Figure 10, is provided for the actuation of the gear couplet 25 having a shifter arm 45 integrally connected therewith and having its other end engaging the spool of the gear couplet. Similarly piston rods 46, 47 and 48 are provided for the other shiftable elements having integrally connected therewith the shifter arms 49, 50 and 51 respectively. The ends of these arms engage the spools of the shiftable elements 26, 32 and 40, 41 respectively. Each of these piston rods have pistons formed on their opposite ends. The piston rod 44 is mounted in the cylinders 52, 53 and the remaining piston rods 46, 47 and 48 are mounted respectively in cylinders 54, 54' and 55, 55' and 56, 56'. From the diagram shown in Figure 10, it is apparent that if fluid pressure were admitted to any one of the cylinders a movement of the respective shiftable element of the transmission connected with the piston rod would result.

Since gear couplets 25 and 26, as previously described, are mounted on the same shaft, it is apparent that only one of these may be in power transmitting position at a time, otherwise breakage of parts would result. To insure against this and to place the idle member in a neutral position, an interlock 144 is provided between the piston rods 44 and 46 which may be of any form that will prevent movement of one couplet into power transmitting position until the other couplet is in neutral position, the interlock shown in our copending application Serial Number 395,929, filed September 28, 1929 being suitable for this purpose.

In order to control the admission or discharge of pressure to each of these cylinders and thereby the movable elements of the transmission and its resultant speed, a control or selector valve, such as 57, has been provided and comprises a power rotated valve member 58 journaled in a bracket 10' attached to the column. An outer sleeve 59, held against rotation by the set screw 60 and having an inner sleeve 61 fixed therewith, is journaled on the valve member 58. The inner sleeve is provided on its periphery with a plurality of annular grooves, such as 62 to 69 inclusive which communicate with the channels 62' to 69' respectively. Each channel connects with one of the shifter actuating cylinders. Fluid pressure is admitted to the valve through the channel 78' which communicates with the annular groove 78 having a port 77 therein communicating with the annular groove 76 in the rotatable valve. A port 75 connects this groove with the longitudinal bore 74. By this arrangement the bore 74 is constantly supplied with fluid pressure irrespective of the rotative position of the valve. The fluid flows from bore 74 into the radial channels 72' which are constantly under pressure and adapted upon registry with ports formed in the annular groove 62 to 69 inclusive of the sleeve 61 to supply pressure to the cylinders connected with the respective grooves. The ports are arranged around the periphery of the valve member 58 in a manner to admit pressure to the cylinders in predetermined combinations upon each sixteenth of a revolution of the valve member, to thereby effect speed changes in the transmission in predetermined steps, it being apparent that a full revolution of the valve is necessary to effect the full range of speeds possible in the transmission.

Simultaneously with the admission of pressure to one combination of cylinders, the opposing cylinders thereto must be connected to an outlet to permit escape of fluid trapped therein, otherwise no movement will result. This is provided for by arranging another set of ports in the annular grooves adapted to connect the opposing cylinders with an outlet channel thereby permitting movement of the associated shifter rods to take place. These outlet channels may take the form of radial channels such as 72, which are so circumferentially and longitudinally spaced in the member 58 that upon admission of pressure to one combination of cylinders, the opposed cylinders thereto will be connected to exhaust. A common outlet or exhaust channel 71 is formed axially of the member into which all the radial channels 72 drain or flow. A pipe 70 which leads to a reservoir, such as 140, is fitted in the end of the bore 71, this connection being such as to permit relative rotation of the member 58 with respect to the pipe.

As an illustration of the operation of the hydraulic shifting mechanism, the valve member 58 is shown in one of its adjusted positions, namely, the position necessary to effect the lowest speed in the transmission. In this position it will be noted that a port 67'' connects the channel 67' with the pressure channel 74, thereby admitting pressure to cylinder 54' to move the smaller gear of the couplet 26 into mesh with the gear 28. At the same time the opposing cylinder 54 is connected to reservoir by coupling its channel 64' with the exhaust 71 by means of the port 64''. Since the gear couplet 26 is now in power transmitting position the gear couplet 25 should be in neutral position and this is effected by providing the ports 65'' and 66'' which connect the opposing cylinders 52 and 53 with pressure thus holding the couplet in neutral position by means of the auxiliary piston sleeves shown in detail in the above referred to copending application. The port 63'' connects the cylinder 55 with pressure while the port 68'' connects the opposing cylinder 55' with exhaust to cause meshing of the larger gear of the couplet 32 with the gear 33. Also the port 62'' connects the cylinder 56 with pressure to cause engagement of the gear 41 with the gear 43 of the spindle, the port 69'' connecting the opposing cylinder 56 with reservoir to permit this movement. It should now be apparent that the ports can be arranged around the periphery of the rotatable valve in desired combination to effect the various rates in progressive order.

Figure 3:
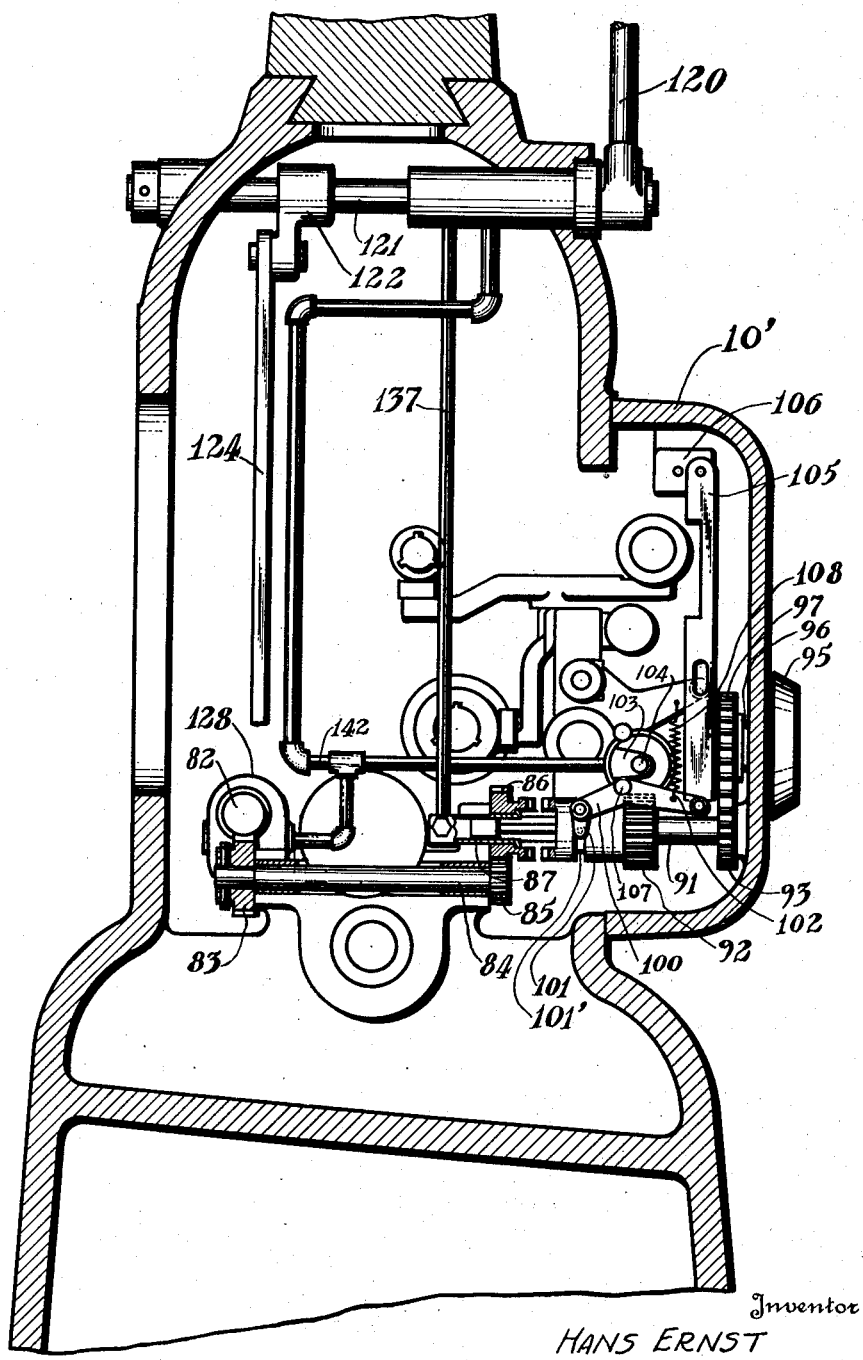
Figure 3 is a vertical section of the machine showing the control mechanism for the transmission.

To effect rotation of the selector valve and thereby changes of speed in the transmission, power means have been provided which, as referred to before, comprise the gear 22 driven from the prime mover 18, as shown in Figure 2. A gear 79, fixed with the gear 22, drives the shaft 80 through the pinion 81 and this shaft through the intermeshing helical gears 82 and 83 actuates the shaft 84 journaled in a fixed part of the column, as shown in Figure 3. The shaft has a pinion 85 at one end meshing with the gear 86 mounted for free rotation upon the fixed bushing 87. The gear 86 has formed integrally therewith the clutch teeth 88 adapted to be engaged by the clutch teeth 89 formed on the shiftable clutch member 90 slidably mounted upon the shaft 91 to which are fixed or keyed the gears 92 and 93. The gear 92 meshes with the gear 94 integral with the rotatable valve member 58, as shown in Figure 4. Thus by shifting the clutch member 90 back and forth the valve member 58 may be connected and disconnected with a source of power for rotation thereof. In order to inform the operator of the position of the valve and thereby the rate of speed at which the transmission is set, indicator means are provided which may take the form of a rotatable dial 95 mounted on the end of a stub shaft 96 journaled in a wall of the bracket 10' and having a gear 97 on the interior thereof meshing with the gear 93. From the construction it should be apparent that as the valve rotates the dial will rotate simultaneously therewith indicating at all times the position of the valve. Indicia may be provided on the peripheral surface of the dial cooperating with a fixed pointer to indicate directly the speed at which the transmission is set.

In order to provide for convenient operation of the clutch member 90, manual control means have been provided which may take the form of a manual lever 98 mounted on the knee of the machine and another lever 99 mounted upon the side of the column whereby the clutch may be controlled from the operator's normal position at the front of the machine, or from an auxiliary position at the side of the machine. A bell crank lever 100 is pivoted to a fixed part of the machine and has the arm 101 for engagement with the clutch spool 101' and the other arm 102 engageable respectively by the cam member 103 mounted on the end of the stub shaft 104, and the link 105 pivotally attached to the crank 106. The stub shaft 104 extends through the exterior wall of the bracket and has the lever 99 attached to its projecting end. It is thus apparent by rotating the lever 99 that the cam 103 will rotate downward as shown in Figure 3, and by engagement with the roller 107 on the arm 102 will effect engagement of the clutch 90 against the tension of the spring 108.

The crank arm 106, previously referred to, is fixed to the end of the rotatable shaft 109, shown in Figure 1, having the reduced pinion portion 110 for engagement with a rack portion 111 of the vertically reciprocable shaft 112. A lever 98 is fixed to the end of the shaft 113 rotatably mounted in the knee which has a projecting pin 114 fixed thereto engaging a socket in the collar 115 fixed to one end of a telescopic shaft 116. The other part of this shaft is rotatably mounted in the base 10 and fixed therein against longitudinal movement and has keyed thereto the cam portion 117 having a peripheral cam track for oscillating the intermediate rock shaft 118, which has a roller at one end in engagement with the cam track and a pin in the other end for engagement with the peripheral groove 119 on the shaft 112. The two parts of the telescopic shaft are splined together so that the knee may be moved up and down without breaking the operating connection between the parts.

Upon rotation of the handle 98, the shaft 113 will rotate the telescopic shaft 116 which by means of the cam attached to the lower end thereof will rock the shaft 118. This will cause longitudinal movement of the shaft 112 which by means of the rack and pinion connection 111, 110 will rotate shaft 109 causing the crank 106 on the end thereof to move the link 105 vertically to operate the clutch 90. It should now be evident that the power actuation of the selector valve may be controlled from either one of two operating positions at the machine.

The clutch 23, previously referred to, is controlled by the lever 120 fixed to the end of the shaft 121 journaled in the upper part of the column upon which is fixed for rotation therewith the crank arm 122 for actuating the clutch shift lever 123 through the connecting link 124. This clutch, as previously mentioned, connects the prime mover with the transmission. To facilitate shifting of the speed change elements of the transmission it is desirable that the transmission be in a non-rotating condition when such changes are made or in other words, that the clutch 23 be disconnected. To insure this relation an interlock or knock-out has been provided between the operating shaft 121 for the clutch 23 and the shiftable clutch member 90 which controls the actuation of the selector valve. To this end a knock-out pin 125 is axially mounted in the shaft 91 and abuts at one end a cross pin 143 carried by the member 90 and at the other a piston 126 slidably mounted in the cylinder 127. The admission of pressure to the cylinder is controlled by the shaft 121 part of which is in the form of a control valve, as shown more particularly in Figure 5. Pressure is supplied to the control valve from a source of pressure such as the pump 128, shown in Figure 10, which may be driven from the prime mover through shaft 80. (Figure 2.) A channel 129 connects the pump to the port 130 formed in the housing surrounding the valve. The port registers with a peripheral annular groove 131 formed in the valve which communicates with a longitudinal passage 132 leading to the radial passage 133 formed in the valve member, (Figures 5, 7 and 8). This passage has a non-return valve therein in the form of a ball 134. Another radial passage 135 at right angles to the passage 133 is formed in the valve member to establish pressure communication with the port 136 upon rotation of the shaft 121.

Since radial channel 135 is in constant communication with the pump, it is always under pressure and to prevent excessive pressures building up when the channel is closed off, as shown in Figure 8, a blow-off or safety valve is provided in the form of a spring closed valve 146 (Figure 9) which permits fluid to escape, to a lubricating system when the pressure exceeds a predetermined limit. In other words, the valve acts as a safety valve in the sense that it limits the pressure in the channel 135 to a predetermined amount and as the pressure intermittently exceeds that amount, oil escapes by the valve and through a port 148 to the lubricating system of the machine. A segmental groove 149, (Figure 11) is formed on the valve member 131' to connect the port 148 with a port 150 which intersects a longitudinal bore 151 formed in the housing. A pipe 147 is threaded in the end of the bore for conducting the oil to a lubricating system indicated generally by the reference numeral 150' (Figure 10) from which the oil will eventually drain back to the reservoir 140.

A channel 137 serves to conduct the fluid from the port 136 to the cylinder 127. Another port 138 is formed in the valve housing which is connected to the return line 139 leading to the reservoir 140 located in the base of the machine. The valve portion 131' of the shaft 121 has a chordal groove 141 (Figure 8) formed therein for establishing communication between the port 136 and the port 138 when the shaft 121 is rotated to disconnect clutch 23 thereby preventing the transmission of power from the prime mover to the variable speed transmission. Upon rotation of the shaft 121 by the handle 120 in a counter clockwise direction from the position shown in Figure 1, the valve will be rotated in a clockwise direction from the position in Figure 8 establishing communication between the channel 135 and the port 136 to admit pressure to the clutch knock-out cylinder 127. In this position of the parts, main clutch 23 will be engaged causing actuation of the variable speed transmission and the cylinder 127 will be under pressure thus insuring that the clutch teeth 88 and 89 will be maintained in a disengaged position. Upon rotation of the handle in the reverse direction, the cylinder 127 will be connected with the return line 139 upon communication being established between the ports 136 and 138. This will permit the fluid in cylinder 127 to be freely forced back to the reservoir upon reciprocation of the clutch 90 and its connected piston 126.

Attention is invited to the fact that a branch line 142 from the line 129 is connected to the pipe 78' leading to the selector valve. This maintains the selector valve under fluid pressure at all times so that upon rotation thereof at any time the movable gears of the variable speed transmission will begin to be shifted to effect progressive changes in the rate of the transmission.

From the preceding description it should be apparent that there has been provided in conjunction with a variable speed transmission, a power actuated rate change mechanism including a selector valve having a plurality of positions, each successive position of which determines a different speed in the transmission in progressive order and mechanism operable simultaneously with the coupling of the transmission to a power source to render the rate change mechanism ineffective to change speeds while the transmission is being actuated.

That which is claimed is:

1. In a milling machine having a rotatable spindle, a variable speed transmission therefor, a prime mover, means to couple the prime mover with the transmission, a branch transmission mechanism connected with the branch transmission for actuation during non-rotation of the spindle, independently actuable clutch means for connecting the branch transmission to the prime mover, and an automatic knock-out for said clutch operable when the first transmission is coupled to the prime mover.

2. In a milling machine having a main transmission and a branch transmission, a prime mover, individual means for coupling either of said transmissions with the prime mover for actuation thereby, and an hydraulic interlock to prevent coupling of the branch transmission with the prime mover when the main transmission is coupled therewith.

3. A milling machine having a main transmission and a branch transmission, a prime mover, individual manual control means for coupling either of the transmissions with the prime mover for actuation thereby and an hydraulic knock-out to prevent operation of one of said control means when the other is in power transmitting position.

4. In a milling machine having a main transmission and a branch transmission, a prime mover for actuating two constantly driven members, means to connect the main transmission with one of said members, independently actuable means for connecting the branch transmission with the other member and an interlock to prevent both of said members being connected to their respective transmissions simultaneously.

5. A milling machine having a prime mover, a power train coupled therewith terminating in two constantly driven members, a spindle transmission and a power actuated speed change mechanism, independent means for connecting the transmission and the mechanism respectively with the constantly driven members and an hydraulic interlock to insure coupling of only one at a time.

6. A milling machine having a rotatable spindle, a variable speed transmission therefor, a speed change mechanism coupled therewith for effecting rate changes therein, a prime mover, clutch means for connecting the transmission with the prime mover, means to couple the mechanism with the prime mover for selective actuation thereby, manual control means therefor, and means to prevent operation of said manual means when the clutch is engaged including an hydraulically actuated lock-out, and a pressure control valve therefor jointly operated with said clutch means.

7. A milling machine having a rotatable element, a variable speed transmission therefor, an hydraulically actuated rate change mechanism coupled with said transmission for effecting speed changes therein, a prime mover coupled with the transmission for actuation thereof, a source of fluid pressure, a rotatable valve for controlling the application of fluid pressure to said speed change mechanism, means to connect said valve with the prime mover for power actuation thereof and manual control means therefor.

8. In a milling machine having a variable speed transmission and an hydraulically actuated speed change mechanism associated therewith, a source of pressure, means to control the application of pressure to the speed change mechanism to effect progressive changes of speed in the transmission, a power source, means to connect said control means with said source for power actuation thereof and dual manual control means therefor, one of said means being located at the operator's normal position at the front of the machine and the other of said means being located at the operator's position at the side of the machine.

9. A milling machine having a column, a cutter spindle journaled therein, a prime mover mounted in the base thereof, a variable speed transmission train between the prime mover and the spindle, a rate change mechanism for varying the rate of said transmission comprising a plurality of hydraulically actuated elements, a source of pressure, unidirectional rotatable valve means for controlling the admission of pressure to said elements and indicator means connected for rotation with said valve to indicate the speed rate of said transmission.

10. A milling machine having a cutter spindle and a prime mover, a variable speed transmission actuated by the prime mover for imparting rotation to the spindle, a rate change mechanism associated therewith, means for coupling the mechanism with the prime mover for power actuation thereby, comprising a bushing closed at one end, a gear freely mounted thereon for continuous actuation by the prime mover, power transmitting elements formed on said gear, an actuating shaft for said mechanism journaled in the open end of said bushing, forming a cylinder, a clutch member coupled for rotation therewith slidably mounted on the shaft for interengagement with said power transmitting elements, to effect power actuation of the mechanism by the prime mover, and means to prevent actuation thereof during rotation of the spindle including a piston slidably mounted in the cylinder having a piston rod connected to the clutch and means operable upon rotation of the spindle to admit hydraulic pressure to the cylinder to prevent engagement of the clutch.

11. A milling machine having a spindle, a variable speed transmission therefor, a rate change mechanism coupled with the transmission, a prime mover, individual clutch means for connecting the prime mover with the transmission and with the mechanism, operating means for each clutch, a control valve coupled with the operating means for one clutch, a piston and cylinder coupled with operating means for the second clutch, a source of hydraulic pressure therefor and means to simultaneously rotate said control valve upon engagement of its respective clutch to connect the source of pressure with said cylinder to prevent actuation of the rate change mechanism.

12. A milling machine having a rotating spindle, a variable speed transmission therefor, a prime mover, clutch means to couple the transmission with the prime mover, an actuating member for said clutch, a control valve simultaneously operated thereby, pressure and return lines connected to said valve, a rate change mechanism for the transmission, a second clutch means for connecting the mechanism with the prime mover for power actuation thereby, a cylinder having a piston working therein and connected to the second clutch means, and a channel connecting the cylinder with the control valve, whereby upon engagement of the first clutch by the actuating member the valve will couple the channel with the pressure line to prevent engagement of the second clutch and upon disengagement of the first clutch, the valve will couple the channel with the return line to permit engagement of the second clutch.

13. A milling machine having a rotatable part, a variable speed transmission connected therewith, a prime mover, a first clutch for coupling the transmission with the prime mover, a branch transmission, a rate change mechanism actuated thereby, a second clutch for coupling the branch transmission with the prime mover, a rotatable operating shaft, means for connecting said first named clutch with the shaft for operation thereby, hydraulic means controlled by said shaft for permitting or preventing engagement of the second clutch, whereby upon engagement of the first clutch said hydraulic means will be effective to prevent engagement of the second clutch and upon disengagement of the first clutch to permit engagement of the second clutch.

14. A milling machine having a rotatable part, a variable speed transmission therefor, an hydraulically actuated rate change mechanism for said transmission including a plurality of shiftable elements, a prime mover, independent clutch means for coupling the transmission and the mechanism thereto for actuation thereby, a rotatable selector valve, channels connecting the selector valve with the shiftable elements, a source of pressure constantly available at the valve and means to rotate the valve to determine the shiftable elements to be connected to said source to effect a desired speed in the transmission.

15. A milling machine having a rotatable spindle, a variable speed transmission therefor, a prime mover, means to couple the transmission with the prime mover for actuation of the spindle, said transmission including a plurality of hydraulically actuated shiftable elements, a source of pressure connected therewith, a rotatable valve interposed between the pressure source and said elements and having a plurality of rate determining positions, means to selectively couple said valve with the prime mover for rotation to a desired rate determining position and means coupled with the valve to indicate the speed effected.

16. A milling machine having a rotatable spindle, a variable speed transmission therefor, a prime mover, means to couple the transmission with the prime mover for actuation of the spindle including an oscillatable control member, a rate change mechanism for the transmission having a plurality of hydraulically actuated shifters, a rotatable valve having a plurality of pressure outlets circumferentially and longitudinally spaced thereon, a surrounding valve casing therefor having a plurality of ports arranged to provide control stations corresponding in number to the speeds of the transmission, means couplable with the prime mover for rotating the valve to a determined station to connect certain channels with pressure and thereby effect a determined speed in the transmission and means controlled by said member to prevent actuation of the valve while the spindle is rotating.

17. A transmission and control mechanism for a machine tool having a rotatable member including a prime mover, a variable speed transmission coupling the prime mover to the member, an hydraulically actuated speed change mechanism associated with the transmission, a pump, a selector valve, a clutch for coupling the valve to the prime mover for actuation thereby, a piston associated with the clutch, parallel channels extending from the pump to the selector valve and to the piston, a valve inserted in the channel extending to the piston, said valve being automatically positionable in accordance with rotation of said rotatable member to couple the pump to said piston to disconnect said clutch, and channels extending from the selector valve to the speed change mechanism to effect actuation thereof.

In testimony whereof we affix our signatures.

HANS ERNST.
LESTER F. NENNINGER.